United States Patent [19]
Walston

[11] 3,828,379
[45] Aug. 13, 1974

[54] CAMPER CONVERTA BOAT
[76] Inventor: Bobby J. Walston, 4457 Parker Ave., Bakersfield, Calif. 93309
[22] Filed: June 1, 1973
[21] Appl. No.: 365,959

[52] U.S. Cl. .................... 9/1 T, 114/61, 280/414 R, 214/515
[51] Int. Cl. .......................................... B63c 13/00
[58] Field of Search ................ 9/1 R, 1 T; 114/61; 74/493, 495, 501 R; 280/414 R; 115/41 R; 214/515; 296/23 MC; 280/87 A

[56] References Cited
UNITED STATES PATENTS

| | | | |
|---|---|---|---|
| 2,588,084 | 3/1952 | Bashfield | 9/1 T |
| 2,928,631 | 3/1960 | Hartman | 115/41 R |
| 3,134,991 | 6/1964 | Levinson | 9/1 T |
| 3,180,601 | 4/1965 | Belt | 214/515 |
| 3,243,161 | 3/1966 | Green | 214/515 |
| 3,254,874 | 6/1966 | Thompson | 214/515 |
| 3,265,025 | 8/1966 | Haigh et al. | 9/1 T |
| 3,303,520 | 2/1967 | Bachley | 9/1 T |
| 3,335,437 | 8/1967 | Judkins | 214/515 |
| 3,414,916 | 12/1968 | Martin et al. | 9/1 T |
| 3,556,549 | 1/1971 | Hershman et al. | 280/87 A |
| 3,622,193 | 11/1971 | Schmidt | 296/23 MC |
| 3,629,884 | 12/1971 | Brown | 9/1 T |
| 3,657,751 | 4/1972 | Shaw | 9/1 R |
| 3,673,622 | 7/1972 | Allen | 9/1 T |

FOREIGN PATENTS OR APPLICATIONS

| | | | |
|---|---|---|---|
| 1,244,431 | 9/1960 | France | 74/493 |

Primary Examiner—George E. A. Halvosa
Assistant Examiner—Edward R. Kazenske
Attorney, Agent, or Firm—Huebner & Worrel

[57] ABSTRACT

A camper converta-boat which is a camper-boat combination utilizing a conventional automotive camper, the body of which is removable from the truck chassis and is coupled with a flat bed trailer on which is supported for transportation purposes a catamaran type boat with a flat deck, including catamaran type pontoons for flotation purposes which are hinged to the deck body and foldable inwardly to reduce width for transportation, and swung down at the sides and locked in position for boating purposes.

3 Claims, 15 Drawing Figures

PATENTED AUG 13 1974 3,828,379

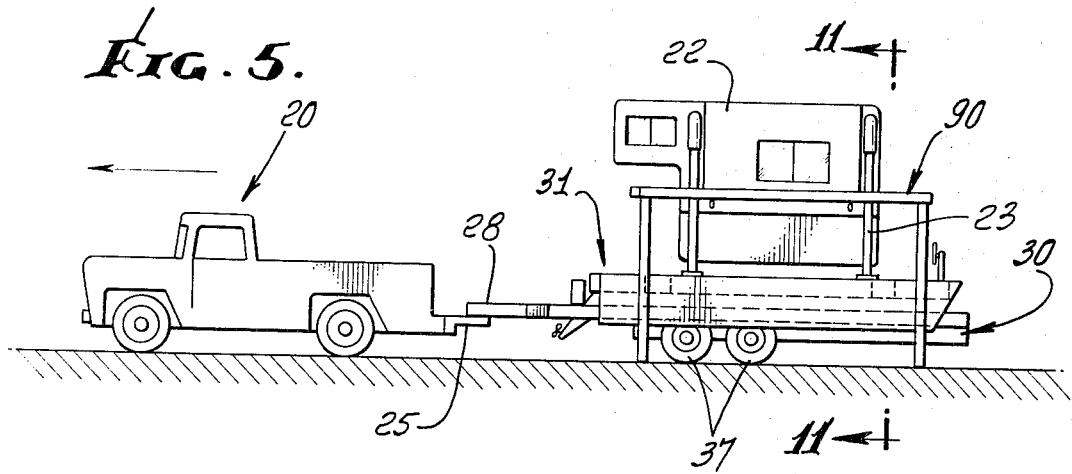
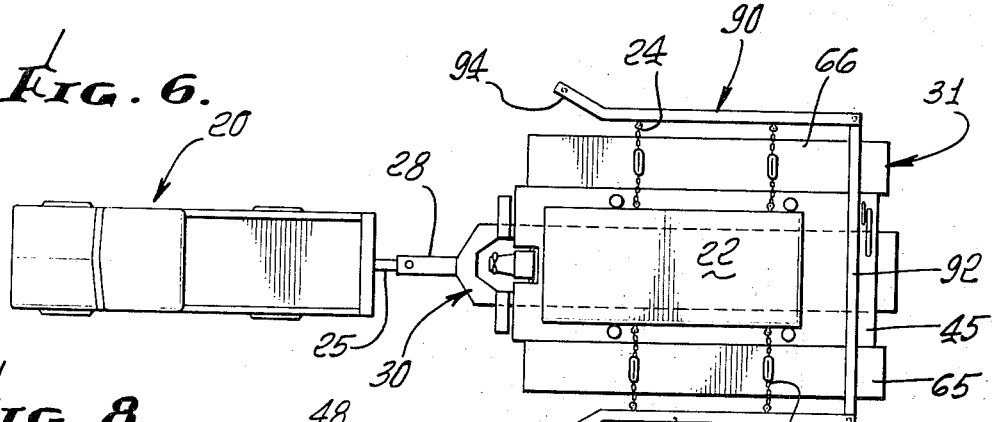
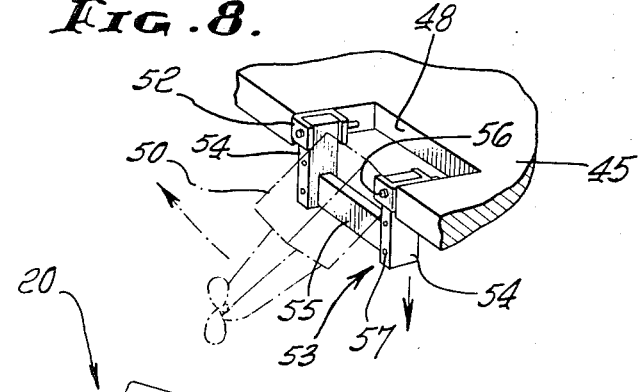
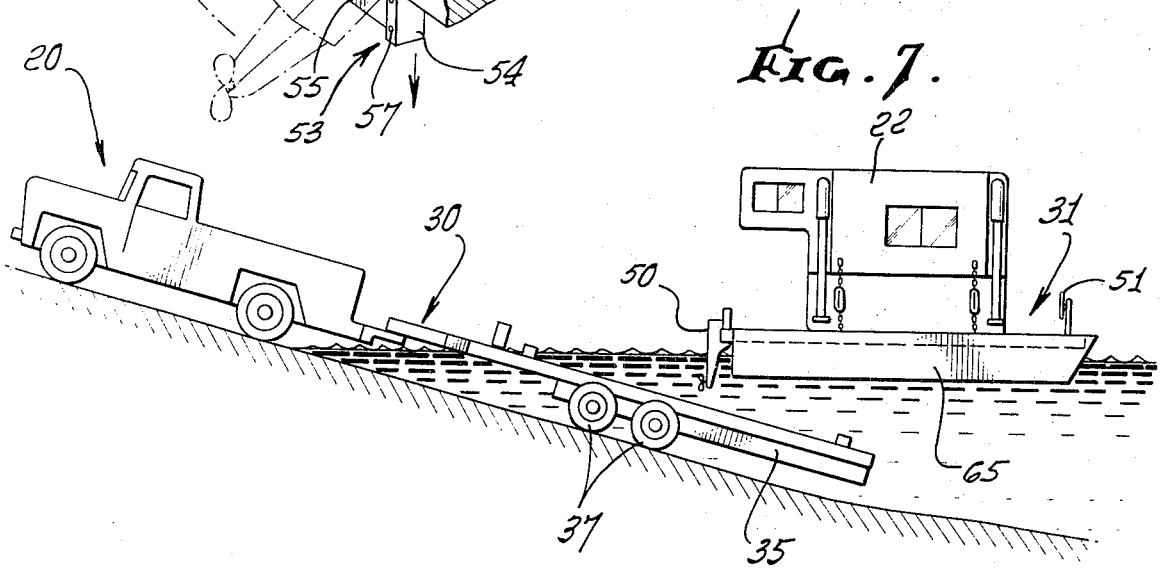

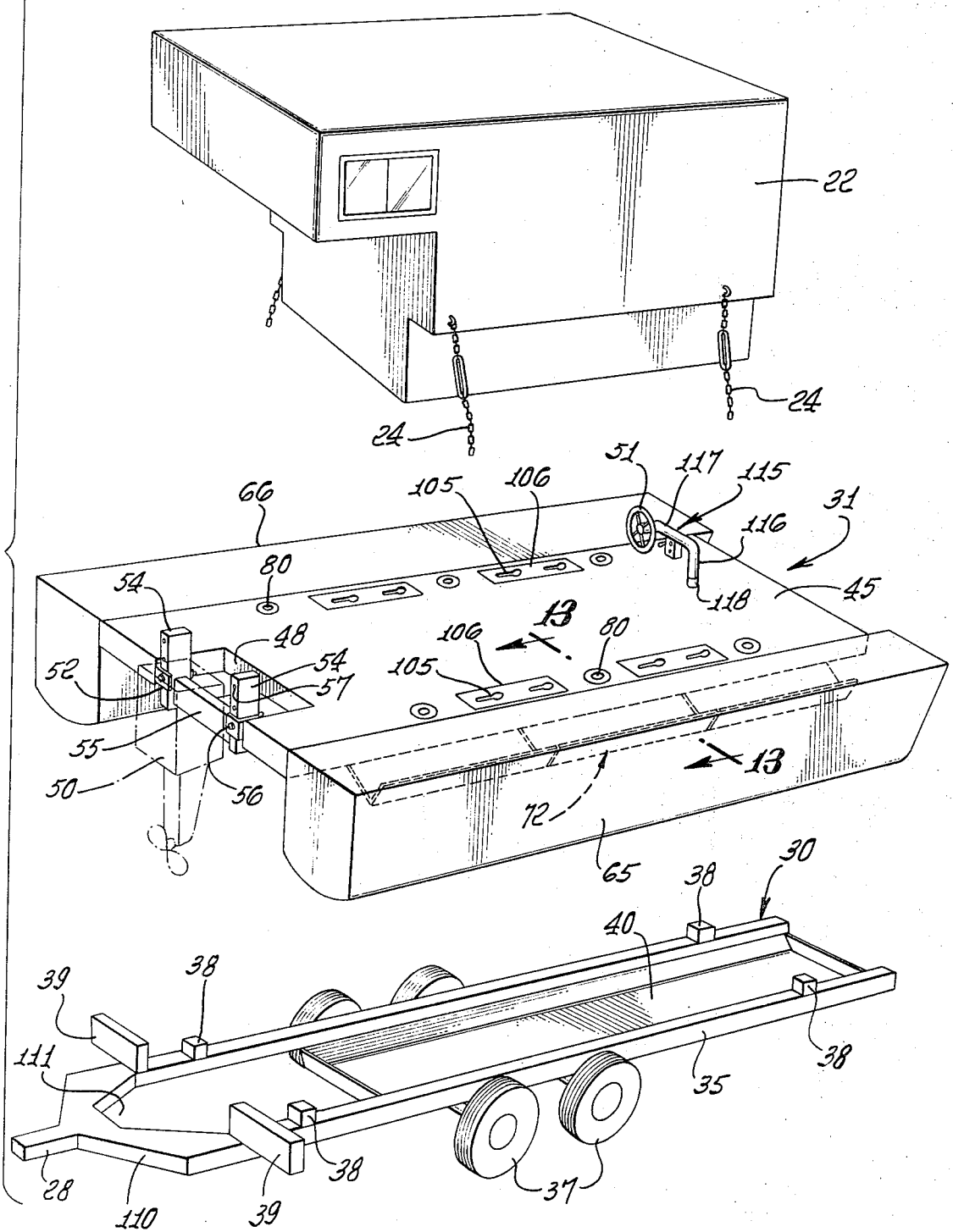

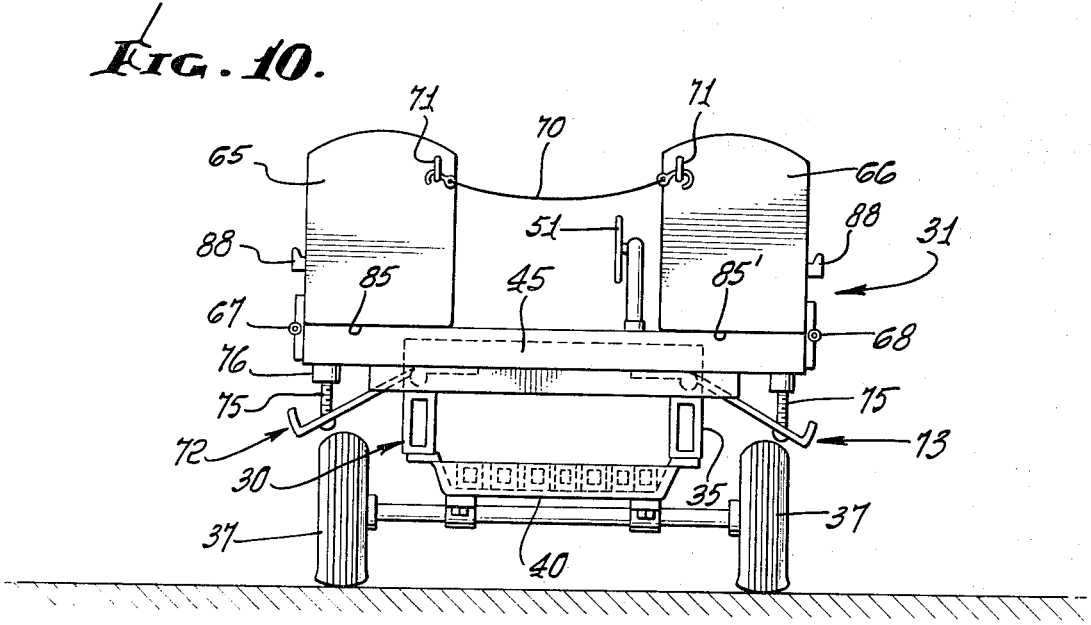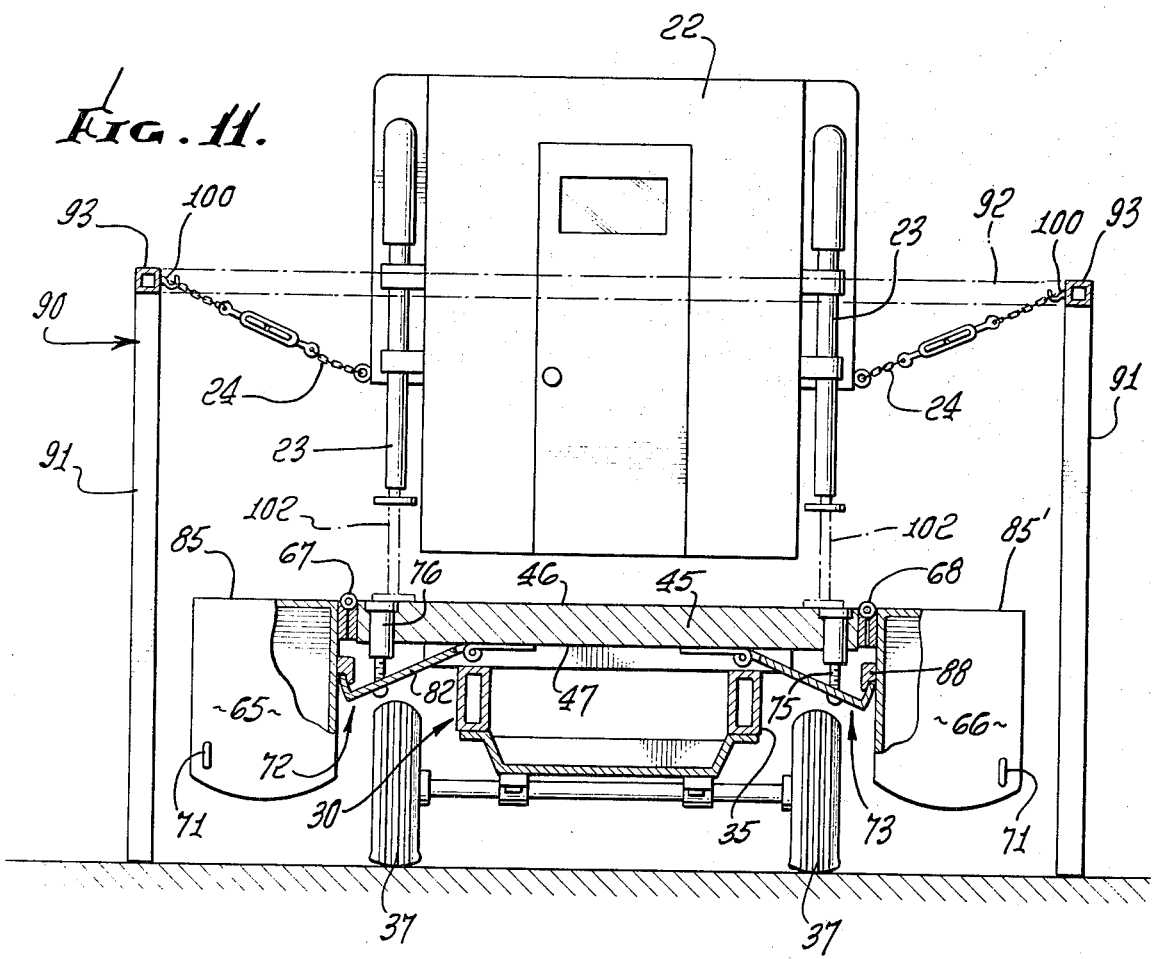

CAMPER CONVERTA BOAT

BACKGROUND OF THE INVENTION

The use of automotive campers with living quarters has become exceptionally popular, and it is common practice to carry a small boat on the top, or to tow one behind on a trailer. There is an obvious restriction on the size and type of boats which can thus be transported.

Houseboats also have gained in popularity for recreational cruising and fishing on lakes and inland waterways.

Many persons desire both modes of outdoor life, and some who can afford to own and maintain a camper and a houseboat, with the necessary mooring for the latter, do so. Many cannot afford both. Moreover, the owning and mooring of a houseboat restricts the area where it can be used, and it cannot be conveniently transported overland.

Various amphibious vehicles have been known, but limitations in size required for travel on highways or roads preclude adapting such equipment to transportable living accommodations as found in campers or houseboats.

SUMMARY OF THE INVENTION

It is a primary object of my invention to provide a camper-boat combination in which the automotive powered camper provides the land transportation and the housed living facilities, and which by trailer means draws a flotation element in the general form of a flat deck raft or catamaran. This element includes elongated pontoons which are hingedly attached to opposite sides of a deck structure and for transport are swung upwardly and inwardly to reduce the overall width.

For use as a boat, the pontoons are swung out and down, locked in place, and thus provide opposite parallel hulls. When thus positioned the top surfaces of the pontoons lie flush with the main deck structure and function as extensions of the deck.

The boat is equipped with an outboard motor provided with remote controls. The boat can be used in that form, if desired, with any appropriate deck chairs or accessories and it is suitable for water skiing if the right size motor is utilized; but its more general use will be realized by removing the body of the camper from the truck chassis and lodging it on the boat deck for launching.

The conversion is readily accomplished, and can be done even by a single individual.

A demountable frame is provided which can be assembled around the camper, the body jacked up and temporarily supported by the frame, the trailer carrying the boat with pontoons lowered is pulled or backed under the camper body, depending upon the desire or necessity for a bow or stern launch, the camper body is then lowered to the deck and secured thereto. The trailer may then be backed into the lake or stream and the boat with the camper body resting thereon will float, freeing the trailer to be drawn back on land. This arrangement provides a conversion of the camper and boat into a houseboat. If it be desired to utilize the boat simply as a flat-decked boat for fishing or picnicing or water skiing without the houseboat conversion, the procedure for lodging the camper body on the deck of the boat simply is omitted.

IN THE DRAWINGS:

FIG. 5 is a side elevation showing the camper body supported in an elevated position over the flat boat.

FIG. 6 is a top plan view of the subject matter of FIG. 5.

FIG. 7 is a side elevation of the "houseboat" being launched into a body of water.

FIG. 8 is a fragmentary perspective of the motor mount area showing the motor tilted up for road travel.

FIG. 9 is an exploded view of the camper body, the flat boat and the trailer.

FIG. 10 is a rear end elevation of the boat and trailer with the pontoons up.

FIG. 11 is a view partly in section taken on the line 11—11 of FIG. 5, but with the camper body suspended on the frame.

DESCRIPTION OF THE PREFERRED EMBODIMENT OF THE INVENTION

Figure 1:
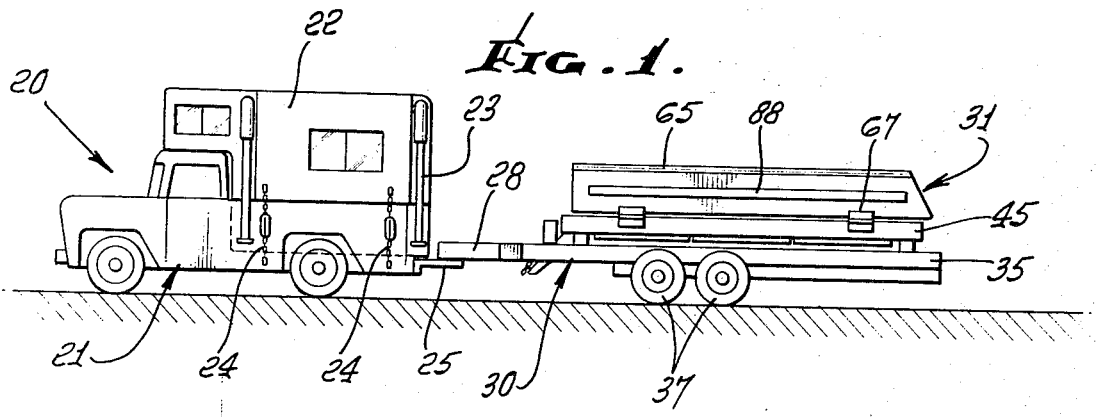
FIG. 1 is a side elevation of the camper vehicle, the trailer coupled to it and the pontoon flat boat mounted on the trailer in condition for road travel.
Figure 2:
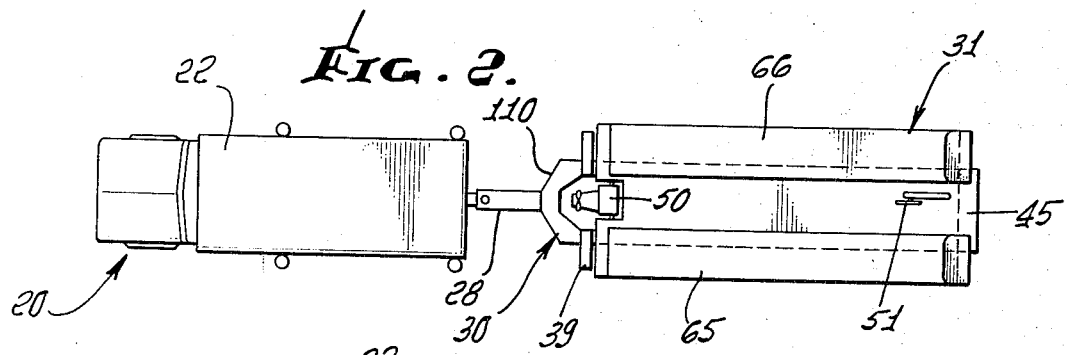
FIG. 2 is a top plan view of the subject matter of FIG. 1. It should be noted that in these views the pontoons are up.

A conventional mobile powered vehicle 20 includes a truck chassis 21 upon which is removably mounted what has been referred to as a camper body 22. The latter is an enclosed housing unit containing living facilities, the latter not illustrated. Such units are usually provided with jacks 23 at both sides thereof whereby the camper body unit may be elevated above the truck chassis 21, in order to remove the camper unit from the truck chassis. The units also come equipped with chain and turnbuckle tie-downs 24 for securing the body to the chassis.

The truck is equipped with a coupling 25 for engagement with a tow bar 28 of a trailer 30. The trailer is of sufficient length to carry a pontoon boat 31 and is of a width restricted to comply with laws relating to highway and road travel. The trailer includes a generally rectangular frame 35 at the forward end of which is the tow bar or tongue 28, the frame being mounted on two pairs of pneumatic tired wheels 37. Blocks 38 are disposed on the frame for lodgment of the deck structure, and transverse stops 39 are secured across the forward portion of the frame. A bottom 40 depends from the frame for the purpose of storing transitional support elements in the form of tubing sections later described, and for any other storage purpose.

The flat boat comprises a deck structure 45 preferably rectangular in shape, having a top surface 46 and a bottom surface 47. For simplicity of illustration the deck structure is shown as a simple rectangular block. In actual fabrication this would probably be constructed of thin metal for the upper surface sustained by a marginal frame and reinforced underneath by ribs or bars to provide rigidity and yet afford lightness. However made, the deck structure is formed with a stern cutout 48 for the reception of an outboard motor 50 which is provided with remote controls, not illustrated, connecting with a wheel 51 disposed near the bow.

The cutout 48 is shown as provided with brackets 52 for retention of a motor mount 53. The latter comprises parallel standards 54 joined by a cross bar 55. The standards are vertically adjustable in the brackets 52, being secured by pins 56 extending through selected holes 57 in the standards. Provision is ordinarily incorporated in an outboard motor for locking the motor in tilted position, as shown in FIG. 8, for road travel, or in propulsion position as shown in FIG. 9.

Pontoons 65 and 66 which are elongated and parallel are hinged at 67 and 68 to the opposite sides of the deck structure 45.

These pontoons are swung up and in over the deck structure for road travel, as shown in FIG. 10, and their weight upon the deck structure ordinarily will retain them in travel position. For security purposes a cable 70 may be hooked into rings 71 to keep the pontoons in place.

The pontoons may be formed of any suitable material, either solid or hollow. It is simply necessary that they may be of sufficient volume in relation to weight of the entire boat assembly including the camper body, that the deck be maintained comfortably above the surface of the water. Some advantage is achieved in making the pontoons hollow, for example of sheet aluminum, and providing compartments therein by suitable partitions for storage of water, provisions, sewage, or other uses.

Upon arrival at a launching area the boat is prepared by swinging the pontoons outwardly and downwardly into the position illustrated in FIG. 11.

Figure 12:
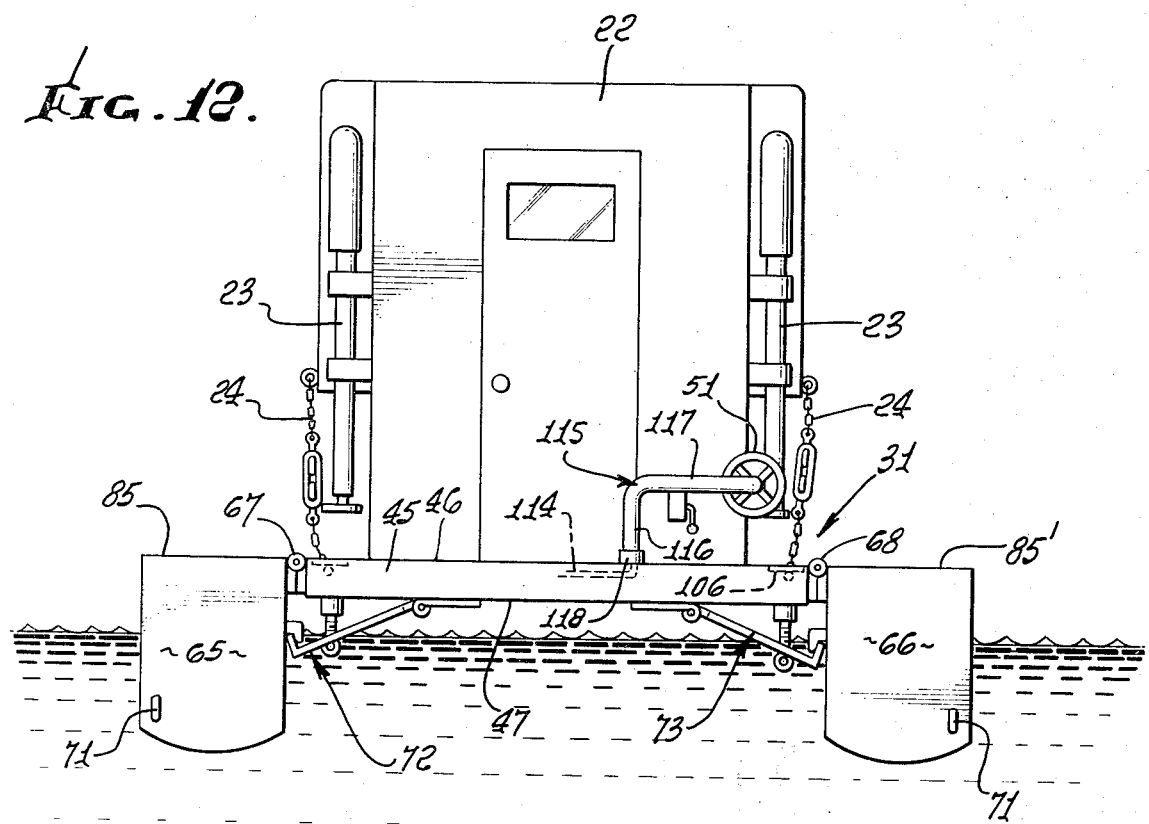
FIG. 12 is a front end elevation of the boat and camper body as assembled constituting the "houseboat" and floating.
Figure 13:
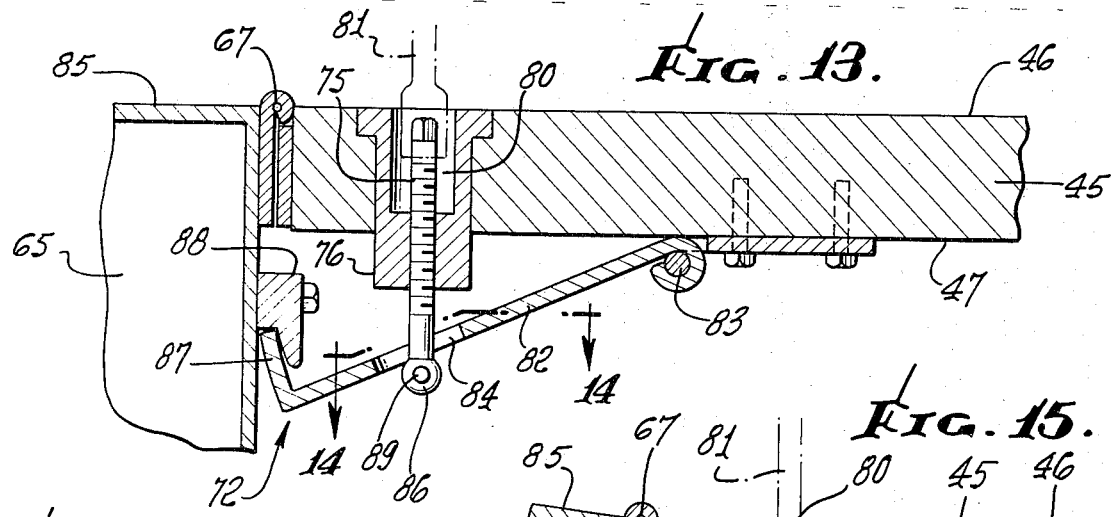
FIG. 13 is a fragmentary section taken on the line 13—13 of FIG. 9 showing principally the detail of the tie-down lock between the boat deck structure and a pontoon.
Figure 14:
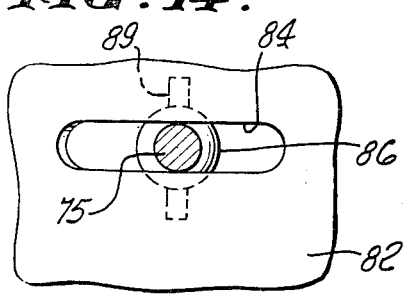
FIG. 14 is a fragmentary section taken on the line 14—14 of FIG. 13.
Figure 15:
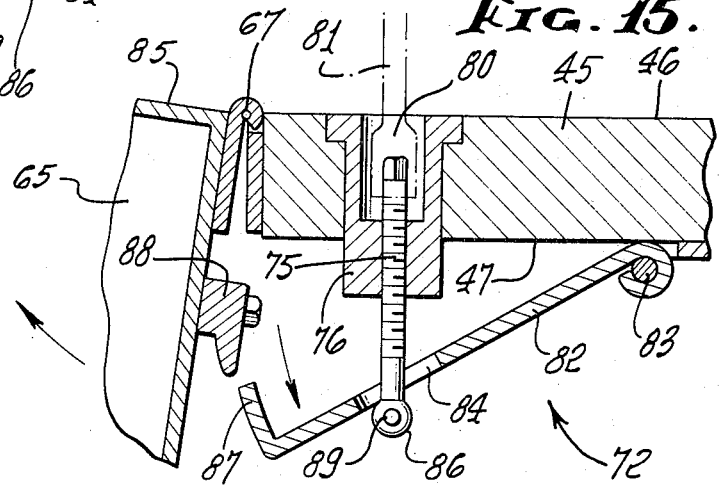
FIG. 15 is a section generally similar to FIG. 13 showing the tie-down lock released to enable the pontoons to be elevated.

It is necessary to secure the pontoons in their down position to provide buoyancy for the boat assembly. For this purpose we illustrate tie-down devices 72 and 73, each comprising a spherical headed screw 75 coacting with an internally threaded anchor member 76 extending vertically through the deck structure. The anchor member is formed with a recess 80 to accommodate a socket wrench 81 for turning the screw. Cooperating with the screw is a locking plate 82 pivotally mounted at 83 to the underside of the deck structure and embodying a slot 84 through which the shank of the screw 75 extends. The spherical head 86 of the screw engages the lower surface of the plate adjacent the slot 84. At the end of the plate opposite the pivot 83 is a generally right angular hook element 87. When the boat is in road travel position, as shown in FIG. 10, the plate assembly rests on the screw head 86, whereas when the pontoons are lowered, as in FIGS. 11 and 12, the hook element 87 is drawn up by turning the screw 75 with the socket wrench until the hook element engages a keeper 88 depending from the side of the pontoon. This locks the pontoons in the down flotation position. It is desirable to extend a pin 89 through the head 86 as a safety retention should the head 86 or the wall of the slot 84 develop excessive wear.

Preferably the upper surfaces 85 and 85' of the pontoons when in the down position are flat and are positioned generally coextensive in plane with the upper surface of the deck structure whereby enlargement of the total deck area is thus provided. These flat surfaces also allow a stable mounting of the pontoons on the deck structure when folded upwardly and inwardly.

To facilitate conversion of the camper and flat boat into a houseboat, it is desirable to employ a temporary support frame 90. This may comprise demountable tubular sections, including four vertical posts 91, a horizontal tie-bar 92 and longitudinal generally parallel rods 93. Preferably these rods 93 flair outwardly at their free ends as indicated at 94. The spacing apart of the rods 93 as determined by the length of the tie-bar 92 should be sufficient for the flat boat with the pontoons down to be moved into the frame.

Figure 3:
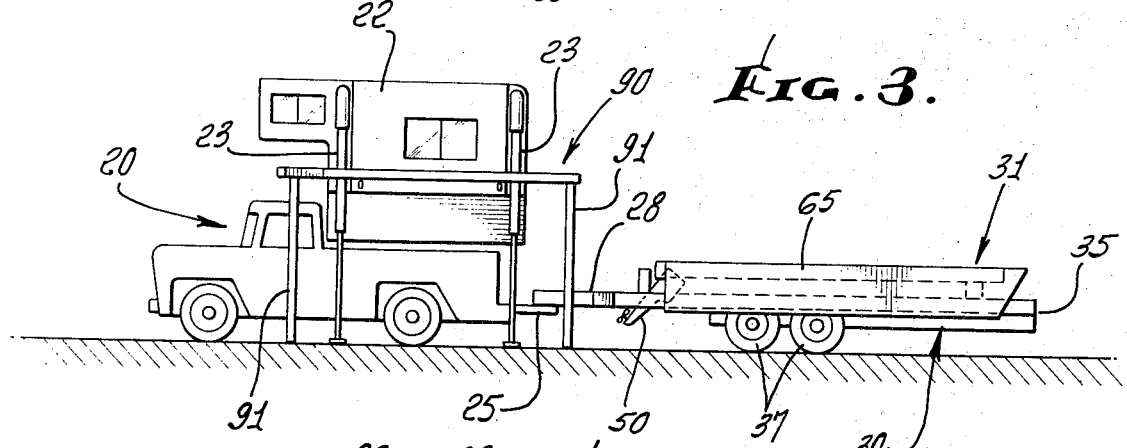
FIG. 3 is a side elevation of the camper vehicle within a supporting frame and the body of the camper elevated by jacks, with the pontoons of the flat boat lowered, ready to be drawn or backed under the camper body. In this view the jacks remain extended preliminary to the body being temporarily lodged on the frame.
Figure 4:
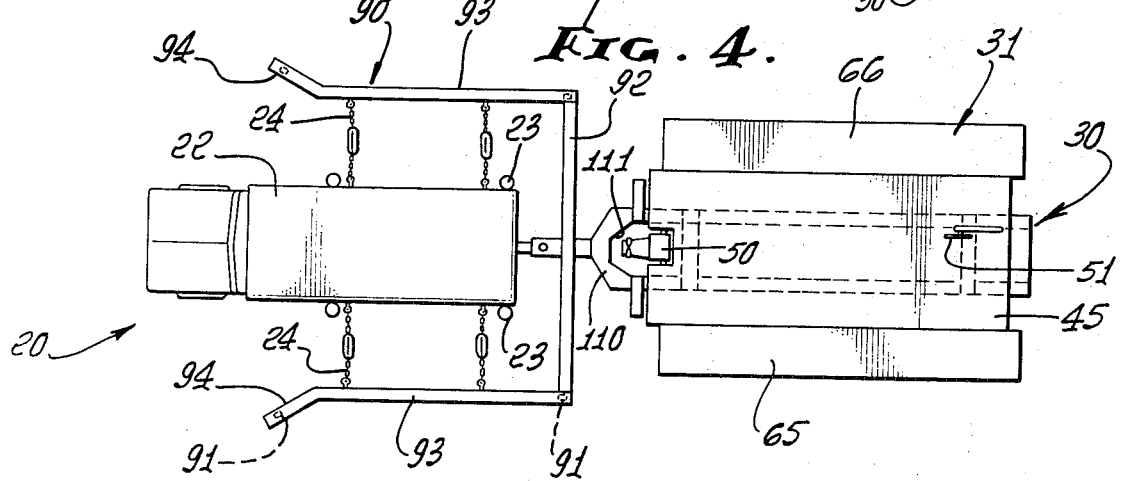
FIG. 4 is a top plan view of the subject matter of FIG. 3.

During the conversion operation, the support frame is assembled around the camper vehicle, or the vehicle is moved within the frame, the jacks are actuated to elevate the camper body free of the vehicle chassis, as shown in FIG. 3, and the body is temporarily sustained in this elevated position by any suitable expedient. The preferred example is shown to be the chain and turnbuckle tie-down 24 secured to hooks 100 on the frame 90. While the body is thus temporarily sustained, the flat boat on the trailer is drawn or backed under the body, the jacks are actuated to come to rest on the deck structure, as shown in broken lines 102 in FIG. 11, the tie-downs 24 are unhooked from the frame, and the jacks are then actuated to lower the camper body onto the deck structure. Suitable means are employed for latching the camper body to the deck structure. This may be accomplished conveniently by slipping the ends of the tie-down chains into bayonet slots 105 of hold down brackets 106 secured to the deck structure. The turnbuckles enable the tie-downs to be tightened for securely holding the camper body on the deck. Alternate latching means may be employed if desired.

The housing unit of the houseboat has been illustrated and described as the body of an automotive camper. The principle of my invention, however, is applicable to some forms and sizes of towable house trailers or mobile homes. For such a conversion the house trailer as an entirety would be elevated by jacks or a crane to a height sufficient for the flat boat to be placed underneath, the house trailer lowered onto blocks, and then tied down to the deck. Optionally, wells or chocks could be formed in the deck structure to receive the wheels of the house trailer, and avoid the need for blocking.

Some camper bodies have a rear overhang depending below the major horizontal plane of the bottom. In using that type, adapter blocks (not illustrated) will be placed on the upper surface of the deck structure to mount the camper at the necessary elevation for accommodation of the overhang.

It should be noted that the tow bar of the trailer includes a yoke 110 providing a clearance space 111 for the outboard motor to be tilted for road travel.

An additional feature of the invention resides in the mounting of the wheel 51. This, with conventional motor controls 114 (see FIG. 12) is positioned on a hollow tubular wheel mount 115 which includes a vertical section 116 and a horizontal section 117. The vertical section is swivelly mounted at 118 on the deck structure. For road travel, the wheel is swung toward the longitudinal central axis of the trailer, so it will not interfere with lodgment of the pontoons. For cruising, the wheel is swung outwardly to the position shown in FIG. 12 so that the pilot may have a stern view past the side of the camper body.

What I claim is:

1. The combination of a boat, a camper vehicle including a chassis and a body removably supported thereon, a trailer adapted to be coupled with the vehicle and to sustain the boat for land transportation and launching, and a demountable frame for use in sustaining the body of the camper for shifting to the deck of the boat, the frame comprising two pairs of vertical standards spaced apart a width sufficient to permit the camper and the boat to pass therebetween, each pair of vertical standards being detachably connected by a longitudinal horizontal bar disposed at a height greater than the boat when loaded on the trailer a transverse bar detachably connected at each end to transversely opposite vertical standards for spacing the latter, said transverse bar being disposed at a height greater than the boat when loaded on the trailer, the frame being open at the end opposite the transverse bar for movement of the camper vehicle into or out of the frame, retractable means independent of the standards on said body for raising the body of the camper off the chassis, and means extending between said horizontal bars and said body for temporarily suspending the body from the horizontal bars in the raised position when said retractable means are retracted to a non-support position whereby the chassis may be used to move the boat under the body for placement of the body on the boat.

2. The combination defined in claim 1 in which the means for temporarily suspending the body from the bars comprises hooks on the longitudinal bars, and tie-down elements on the camper body which are engageable with the hooks.

3. A houseboat comprising a portable flotation element and a mobile housing element removably mounted thereon, the flotation element comprising an elongated generally flat topped deck structure, pontoons hingedly connected to each side of the deck structure and being foldable over the deck structure to reduce the width of the flotation element for road transportation on a trailer, and swingable outwardly and downwardly for use on water, means for locking the pontoons in their lowered position comprising latching members pivotally mounted on the undersurface of the deck structure, engagement members on the pontoons, and means on the deck structure to pivot the latching members into or out of latching contact with the engagement members, the last named means each including mating threaded members one of which is fixed in the deck structure and the other of which extends into said one of mating members and below the deck structure and engages the latching member, and means for removably securing the housing element on the deck structure.

* * * * *